S. H. GILMAN.
Apparatus for Ejecting Bales from Presses.
No. 215,450. Patented May 20, 1879.

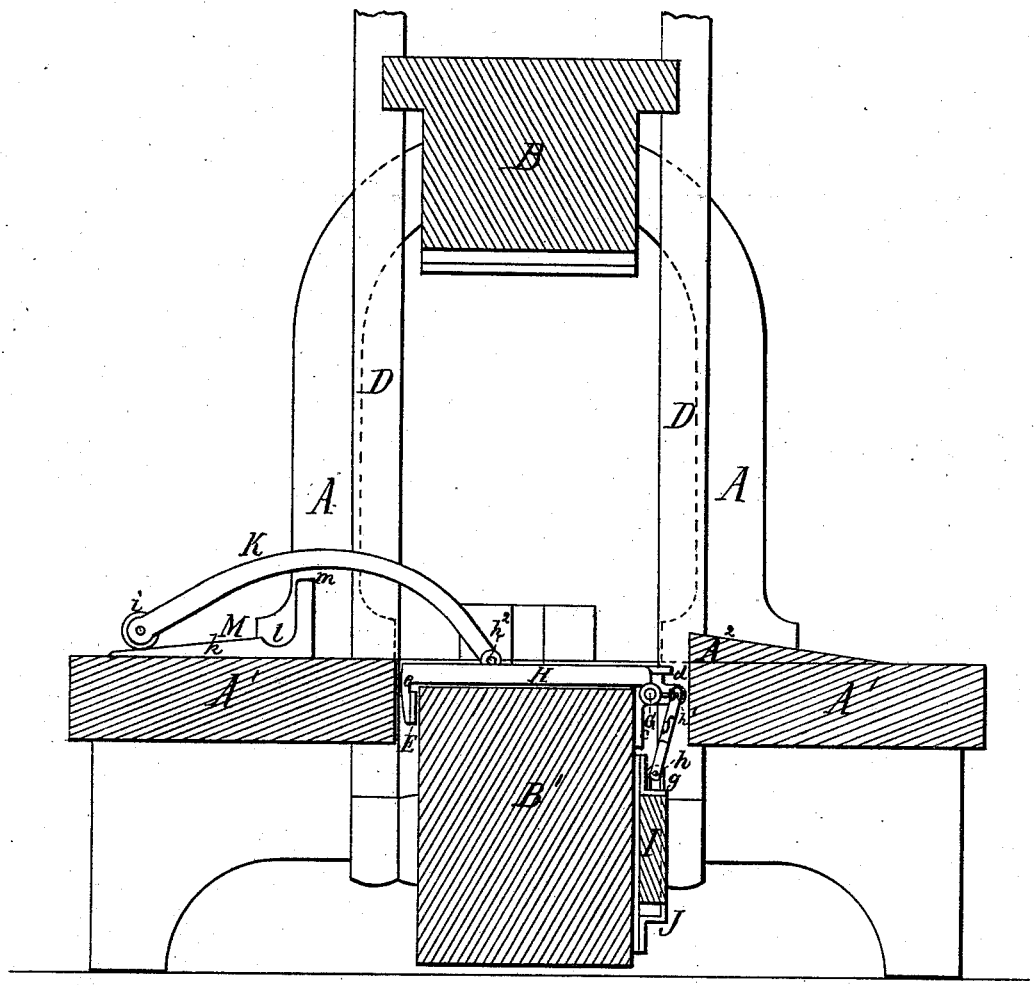

3 Sheets—Sheet 3.

S. H. GILMAN.
Apparatus for Ejecting Bales from Presses.
No. 215,450. Patented May 20, 1879.

Witnesses:
J. P. Th. Lang.
O. O. Didden.

Inventor:
Samuel H. Gilman
by
Mason, Fenwick & Lawrence.

UNITED STATES PATENT OFFICE.

SAMUEL H. GILMAN, OF NEW ORLEANS, LOUISIANA.

IMPROVEMENT IN APPARATUS FOR EJECTING BALES FROM PRESSES.

Specification forming part of Letters Patent No. 215,450, dated May 20, 1879; application filed April 11, 1879.

*To all whom it may concern:*

Be it known that I, SAMUEL H. GILMAN, of the city of New Orleans, in the parish of Orleans and State of Louisiana, have invented a new and Improved Apparatus for Ejecting Bales from Presses; and I do hereby declare that the following is a full, clear, and exact description of the same, reference being had to the accompanying drawings, forming a part of this specification, in which—

Figure 1:
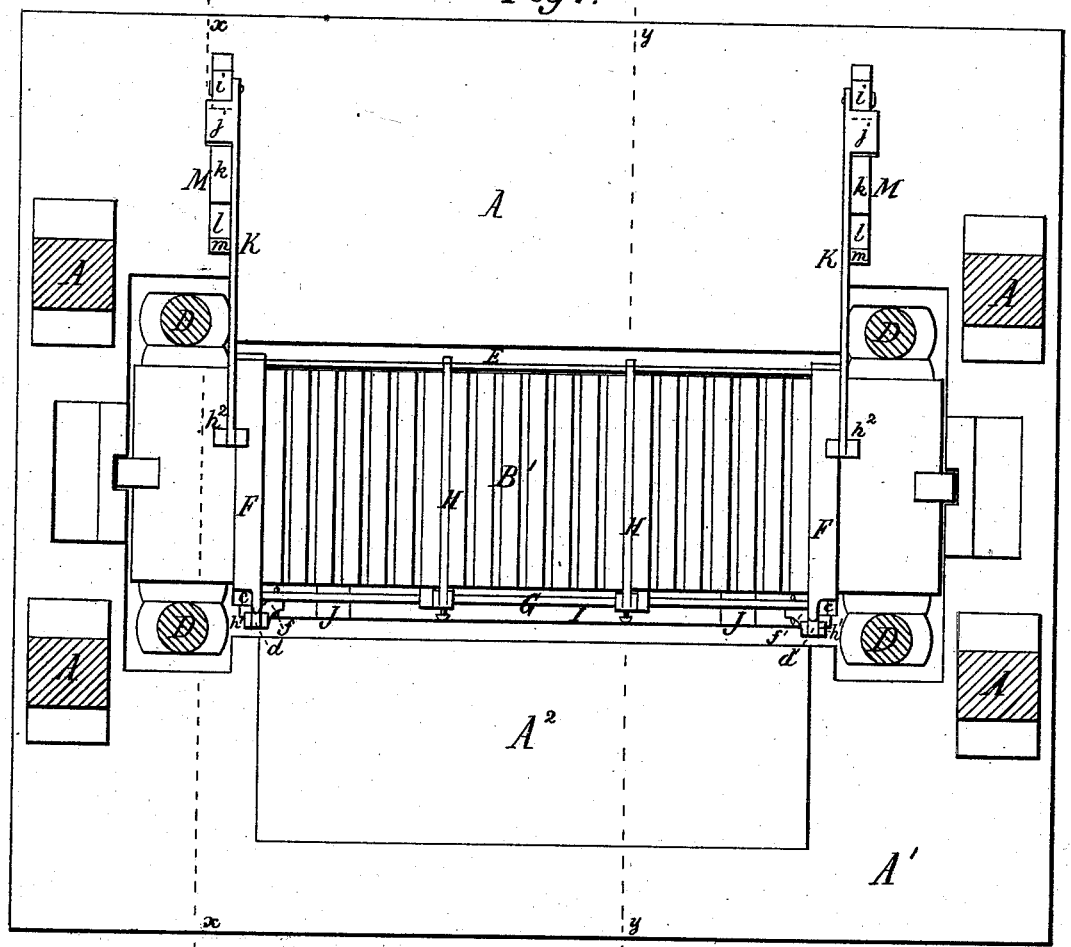
Figure 3:
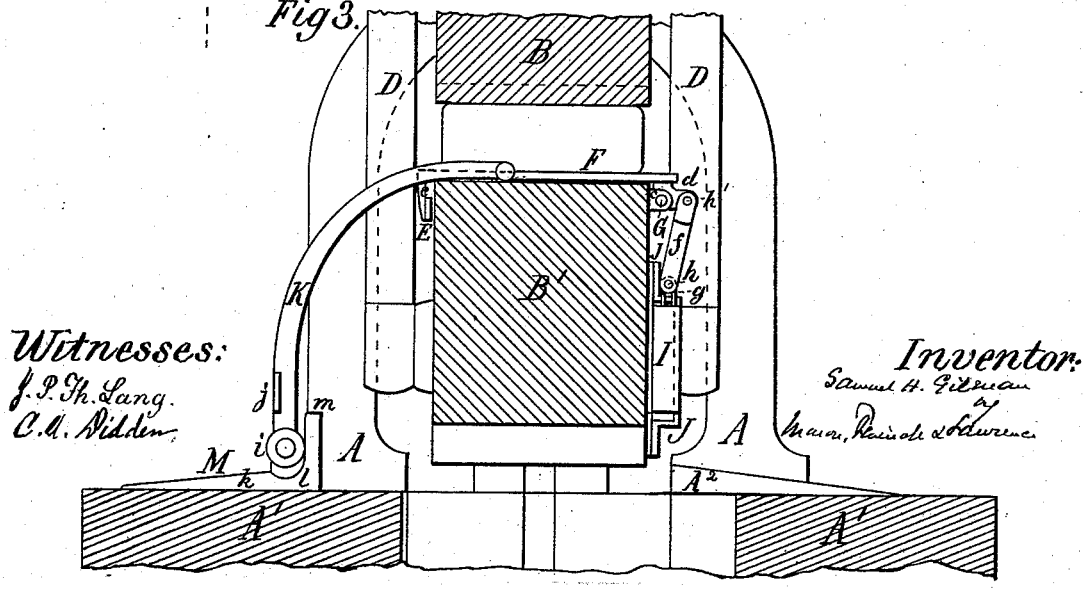
Figure 4:
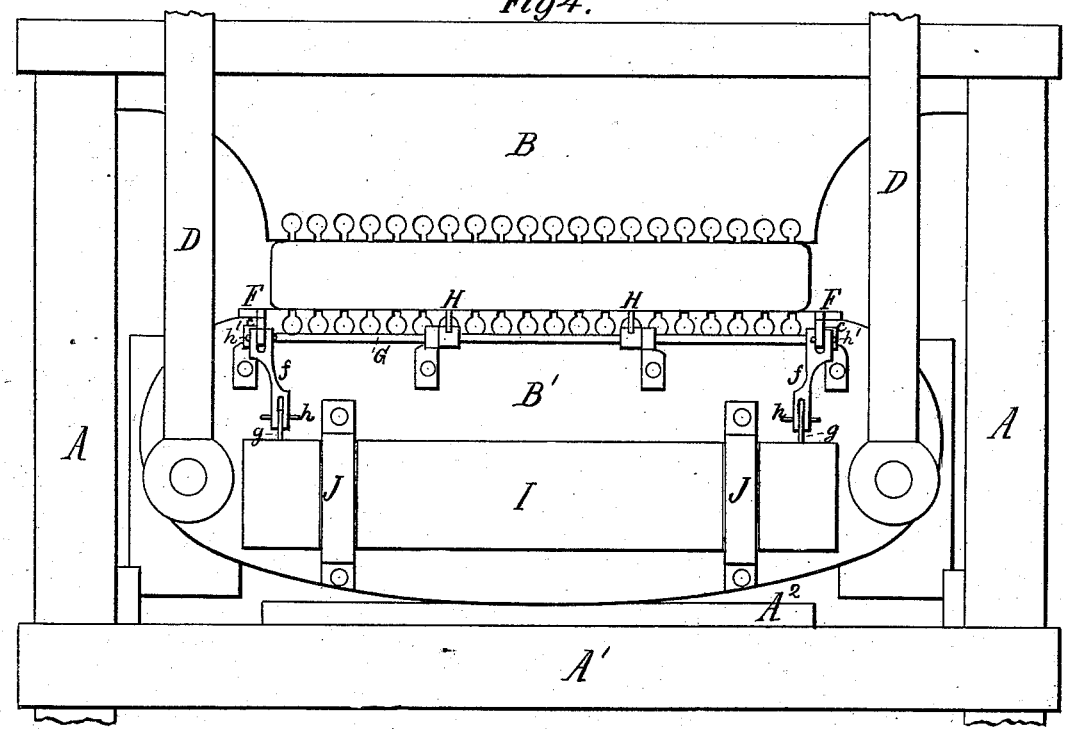
Figure 5:
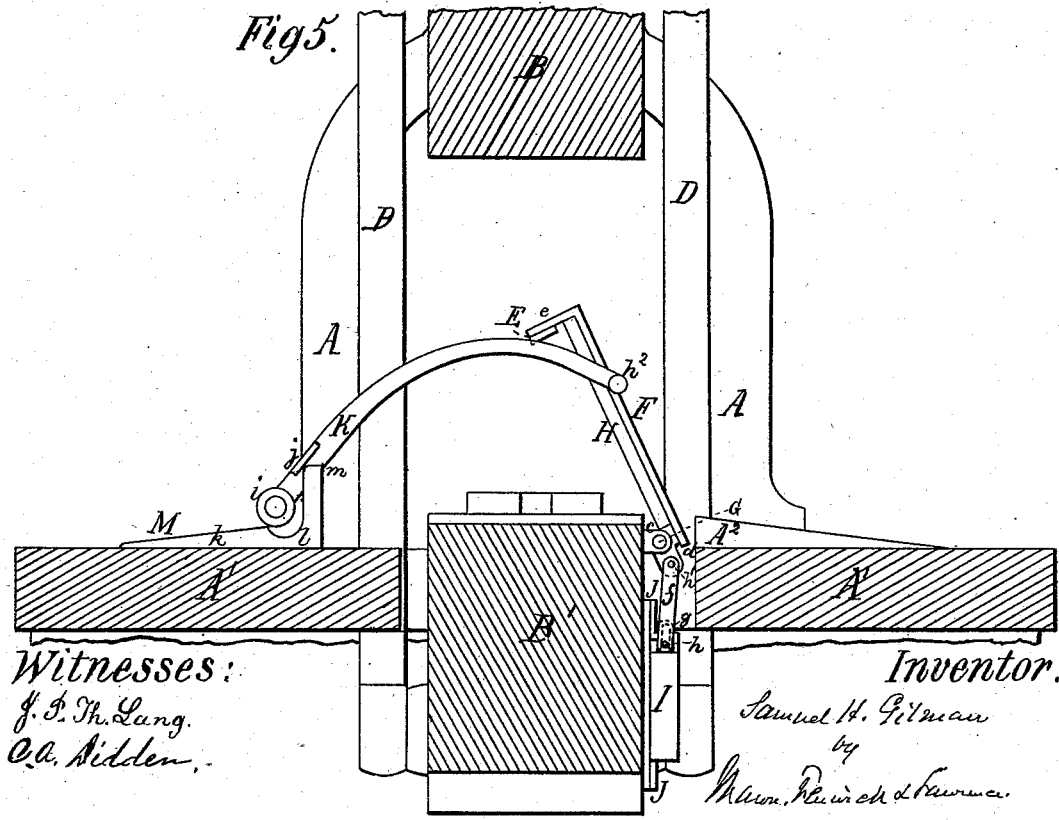

Figure 1 is a horizontal section on a plane above the lower platen of a press or compressor. Fig. 2 is a transverse vertical section in the line $x\ x$ of Fig. 1, showing the platens fully separated. Fig. 3 is a similar section in the line $y\ y$ of Fig. 1, showing the platens with a bale between them, as they appear when the lower platen has been elevated to the extent of its movement. Fig. 4 is a front view of the press or compressor, the parts being in the position shown in Fig. 3. Fig. 5 is a section similar to Fig. 3, the parts appearing in the position they occupy just after the bale has been ejected and the ejector released.

The objects of my invention are, first, to provide an attachment for a cotton or other press or compressor which will throw cotton and other bales out of the press or compressor by the force of the falling weight of the bale itself, in conjunction with the weight of those parts of the press which are dropped down for the reception of another bale to be pressed or compressed, and thus relieve the pressmen of the fatiguing labor of throwing out the bales after they are pressed or compressed, and also save time and increase the speed of compressing cotton and other substances; second, to prevent injury to the ejecting mechanism from sudden jerks and knocks while it is assuming its normal position after having ejected a bale, which object is effected by allowing said mechanism to descend partly to its normal position unrestrained, and then restraining its further sudden descent by a counterbalance, which allows it to descend in a slow and gentle manner to said position.

In the accompanying drawings, A represents the stationary frame-work of an ordinary press or compressor, and $A^1$ the platform or flooring provided with an inclined sill, $A^2$, upon which the cotton-bale to be compressed is slid into the press and upon which it is ejected. To the upper part of this frame the upper platen, B, is firmly attached. Directly under this platen, in a recess cut through the platform or flooring $A^1$, the lower platen, B', is arranged to move in guides, as shown, it being suspended upon rods or hangers D D, which are suitably connected with an appropriate engine above the platen B, and which rods, with the platen B', are caused to rise by the power of the steam-engine and compress the bale.

E F G represent an ejecting-frame, which encompasses the slightly-elevated grooved top portion of the lower platen, B'. The three sides E F F are flat bars of metal, and the fourth side, G, is a round shaft, vibrating in eye-brackets $c$, secured to the front of the platen B'.

The end pieces, F F, are attached by their front ends to the shaft G by short elbow-levers $d$, and by their rear ends to the bar E by angular extensions $e$, as shown.

Between the end bars, F F, at equal distances apart and at equal distances from the bars F F, are applied lifting-bars H H, having one of their ends hinged to the shaft G, and their opposite ends rigidly fastened to the bar E. These lifting-bars are just broad enough to fit down into grooves of the platen B' and have their upper edges either flush with or slightly below the top surface of the said platen; and the bars F F are applied to the platen in a manner to have their top surfaces either flush with or slightly below the top surface of the grooved portion of the platen, while the front shaft, G, and the back bar, E, occupy positions some distance lower down, as shown.

I is a long counterbalance-weight, attached to the front of the platen B' by means of loop-shaped straps J, which are longer than the width of the counterbalance-weight, in order that the weight I shall have a chance to move up and down in them a certain distance. This weight is connected to the elbow-levers $d$ of the side bars, F F, of the ejector-frame by means of links $f$ and oblong loops $g$. By means of the links $f$, hinged-joint connections $h^1$ are formed, and by the loops $g$ and pins $h$ sliding-joint connections are formed, and the counterbalance-weight is allowed to descend to the bottom of the loop-straps J, and the pins h, which connect the weight I to the links f, can descend a certain distance without influencing the weight, from which position they also can ascend without raising the weight along with them. This descent of the pins h of the links f is caused by the movement of the ejecting-frame from its horizontal position (shown in Figs. 2 and 3) to the inclined position, (shown in Fig. 5,) which movement causes the lever-arms of the elbow-levers d to move downward and backward, and thereby depress the links and their pins h.

The advantage of this movement of the pins in the loops g is this: The ejecting-frame and its connections are kept free from the restraining effect of the counterbalance-weight when the frame first begins to fall back to its normal or horizontal position, and thus it is allowed a sudden free movement, due to its gravity, which insures its return to its proper position, which movement is only partially checked by the pins h rising to the top of the loops g and lifting the counterbalance-weight at a moment when the speed acquired by the descending frame E F G, together with the weight of the same, cannot be overcome by the weight, except so far as the weight will and does prevent a further sudden descent of the frame, and so insures a gradual and gentle final dropping of it in its place ready for a new operation of ejecting a bale.

To the sides of the bars F F of the ejecting-frame lifting-rods K K are pivoted, as at $h^2$ $h^2$. The rear ends of these rods carry small wheels i i, but are not otherwise connected to any part of the press.

j j are two flat tripping-plates, projecting from the outer sides of the lifting-rods K, near their outer ends, and in close proximity to the wheels i i, as shown.

M M are two shoes or short rails, having inclined planes k, and semicircular notches l and a tripping-stop, m, as shown. On these rails the wheels i i roll forward while the platen B' is being raised; and when the platen is fully raised the wheels fall into the notches l and rest until the platen B' is started downward, and during the descent of the platen the fulcrum-rod G of the frame descends with it, and notched portions l of the rails M act as abutments for the lifting-rods to abut against, and thus the parts E F and the lifting-bars H of the ejecting-frame are caused to assume the inclined position and eject a compressed bale from the press, as illustrated in the drawings.

As soon as the lower platen, B', has descended far enough to effect the ejectment of the bale, the tripping-plates j j will have struck against the rounded upper ends of the upright stops m, as shown in Fig. 5, and by this means the wheels i i are lifted out of the notches l over upon the inclined portions of the rails M, whereupon the ejecting-frame, by its gravity, descends to its normal or horizontal position, ready for another operation; the wheels i i rolling back on the rails M M. In its descent the ejecting-frame first moves suddenly, independently of the counterbalance-weight I, for a certain distance, and then gradually and gently moves on down, with the counterbalance-weight restraining it, said weight only checking its final descent, and thereby causing it to assume its normal position without jarring and breaking its connections.

I claim—

1. A bale-ejector for presses, attached by one of its sides to the platen B', and by its other side to lifting-rods K, whereby the ejector at one side is lowered, and at the other side is thrust forward and held up while the platen is descending, and the ejector thus caused to deliver the pressed bale from the press while the platen is moving down to a position for another bale, substantially as described.

2. Rails or shoes M, provided with inclines k, stop-recesses l, and tripping-stops m, substantially as and for the purpose described.

3. Lifting-rods K, provided with supporting-wheels i i and tripping-plates j j, substantially as described.

4. The bars H H of the frame E F G, in combination with the grooved platen, whereby said bars are permitted to seat themselves in grooves of the platen beneath the bale while the bale is being compressed, substantially as described.

5. The counterbalance-weight I, in combination with the bale-ejector, whereby the ejector and weight, respectively, are allowed independent movements to a limited extent, and then both the weight and ejector are caused to move together, substantially as and for the purpose described.

Witness my hand in matter of my application for a patent for an improved ejector for ejecting cotton and other pressed bales from presses or compressors.

SAMUEL H. GILMAN.

In presence of—
D. J. DOWERS,
ANDREW HERO, Jr.